United States Patent
Cok

(10) Patent No.: US 8,312,111 B2
(45) Date of Patent: Nov. 13, 2012

(54) IMAGE PROCESSING IN A COMPUTER NETWORK

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 217 days.

(21) Appl. No.: 12/827,337

(22) Filed: Jun. 30, 2010

(65) Prior Publication Data

US 2012/0005308 A1   Jan. 5, 2012

(51) Int. Cl.
   *G06F 15/16* (2006.01)
   *G06F 15/173* (2006.01)
(52) U.S. Cl. .......................... 709/219; 709/241; 370/238
(58) Field of Classification Search .................. 709/201, 709/205, 217, 219, 232, 241, 247, 234, 235; 710/61; 370/229, 231, 232, 238
   See application file for complete search history.

(56) References Cited

U.S. PATENT DOCUMENTS

| | | | |
|---|---|---|---|
| 2003/0235338 A1 | 12/2003 | Dye | |
| 2004/0044732 A1* | 3/2004 | Fushiki et al. | 709/205 |
| 2005/0053301 A1 | 3/2005 | Chui et al. | |
| 2006/0164982 A1* | 7/2006 | Arora et al. | 370/229 |
| 2007/0192511 A1* | 8/2007 | Kim | 709/247 |
| 2007/0283358 A1* | 12/2007 | Kasahara et al. | 718/104 |

FOREIGN PATENT DOCUMENTS

| | | | |
|---|---|---|---|
| JP | 03064140 A | * | 3/1991 |
| JP | 2002033733 A | * | 1/2002 |
| JP | 2008028659 A | * | 2/2008 |

* cited by examiner

*Primary Examiner* — Wing Chan
*Assistant Examiner* — Kostas Katsikis
(74) *Attorney, Agent, or Firm* — Eugene I Shkurko

(57) ABSTRACT

A computer system connected to a communication network processes image files. A second computer connected to the network includes the image files and the program for processing the image files. The first computer includes a costing program for determining a time cost for the first computer to process the image files stored there, and for determining a combined cost of the first transfer cost, the second processing cost, and the second transfer cost. The image file(s) are transferred over the network from the first computer to the second computer if the costing program determines that the combined cost is smaller than the first processing cost.

14 Claims, 6 Drawing Sheets

IMAGE PROCESSING IN A COMPUTER NETWORK

CROSS REFERENCE TO RELATED APPLICATIONS

Reference is made to commonly-assigned copending U.S. patent application Ser. No. 12/827,377, filed of even date herewith entitled, "Efficient Method For Image Processing In A Computer Network" by Ronald S. Cok, the disclosure of which is incorporated herein by reference in its entirety.

FIELD OF THE INVENTION

The present invention relates to efficient interactions between computers in a network, and particularly to server computers that perform computations in conjunction with client computers for large data files or data sets such as digital images.

BACKGROUND OF THE INVENTION

Computer networks typically include multiple computers connected to a common computer communication network, for example the internet. In some computer networks, a server computer provides services to a client computer. The client computer can be a remote computer that accesses services over the computer network. The server computer, in turn, can access other networked computers providing services useful to the client for the benefit of the client instead of requiring the client to directly access those networked computers.

A typical internet-mediated enterprise conducts business with customers by interacting with users through a web browser on the users' computer. A user contacts a server computer through the web browser on a client computer and requests information. A server provides web pages to the client computer. The client computer displays the pages to the user. The user then interacts with a user interface presented by the web pages. The interaction can take a variety of forms, depending on the nature of the business. Typically, the business provides products for sale and the products are shown to the user through the web browser on the client computer and the information presented by the web pages from the server computer.

Some internet-mediated businesses use large data sets, for example, by transmitting digital images over the network. The images can take perceptible amounts of time to transfer over the internet. Furthermore, some image products are customized by users who desire to process their digital images and use the processed image as part of the image products. Processing large-sized digital images also can take a perceptible time.

Image product businesses, for example, businesses that print images for customers, often store the customers' images on a remote server. Customers can then request image prints or other products, that use one or more of their images or other images, such as photo-books. Image processing for rendering the customer images within the products can be performed by the server. However, when customers interact with the images, the images are often displayed on the client computer and are processed on the client computer with programs downloaded from the server that execute on the client computer.

It is usually the case that client computers are lower cost and have a lower performance than commercial computers used as servers to conduct business and provide web pages over the internet. It is also true that servers typically support a variety of customers at the same time, sharing the server computer resources between the customers. Thus, the available computing resource on a server, or even a client, computer varies over time depending on the demand for the resource from other customers or other computing tasks. Available internet bandwidth is likewise subject to the amount of traffic requested. As more users transfer more data at the same time, the bandwidth available to a single user decreases and the time required to transfer data for that user increases.

Task responsiveness is an important characteristic of any computer application running on a single computer or on a computer network. In particular, users performing work with a computer or computer network prefer that they not have to wait for the work to complete. Some computing tasks are performed through a web browser executing on a client computer that interacts with a network-connected server computer. The network-connected server computer can provide web pages to the client with which the user interacts. If the server computer responds too slowly to a client computer request, the user operating the client will become frustrated and may even abandon the task. Hence, efficiency, and especially responsiveness, are important issues for network service providers.

Responsiveness can be improved by increasing the network bandwidth to improve communication rates. This is particularly useful when large amounts of data are communicated between the various network computers, especially between a client and a server, and between a server and a networked storage system. One example of large data sets is a set of digital images. The time required to transmit digital images from a client to a server over a network can be lengthy. Responsiveness can also be improved by increasing the capacity of the various network elements, for example by using faster computers with more memory.

While increasing the performance of network devices is useful, there remains a need for improving networked computer services to provide responsive and efficient performance for given network and computing resources.

SUMMARY OF THE INVENTION

A preferred embodiment of the present invention comprises a computer system having a first computer connected to a communication network, the first computer including one or more stored image files and a program for processing the image files. A second computer connected to the network includes the one or more image files and the program for processing the image files. The first computer also includes a costing program for determining a time cost for the first computer to process the image files stored there, for determining a transfer cost for transferring the image files from the first computer to the second computer, for determining a processing cost for the second computer to process the image files stored there, for determining a transfer cost for transferring a processed image file from the second computer to the first computer, and for determining a combined cost of the first transfer cost, the second processing cost, and the second transfer cost. The image file(s) are transferred over the network from the first computer to the second computer if the costing program determines that the combined cost is smaller than the first processing cost.

Another preferred embodiment of the present invention includes a computer system for processing digital image files which comprises local and remote computing resources coupled to a communication network where a digital image is stored in one of the local resources. A turnaround time for processing the digital image file is calculated and stored in the local resource. A remote turnaround time is similarly calculated and stored. After comparing the local and remote turnaround times, either the local resources or the remote resources are selected for processing the digital image.

Another preferred embodiment of the present invention includes a network-connected computer comprising a first computer, a second computer, and a computer network. The computer network couples the first computer and the second computer and transfers information between the first computer and the second computer upon request. One or more image files is stored on the first computer which also includes a program for processing an image file on the first computer and the second computer has a program image processing the image file stored there. A program for calculating a time cost estimation is on the first computer and a second program for calculating a time cost estimation is on the second computer. A first image-file transfer cost is estimated for transferring the image file from the first computer to the second computer, and a second image-file transfer cost is estimated for transferring an image file resulting from the processing operation on the second computer from the second computer to the first computer. A program for calculating a combined cost of the second image-file processing operation, the first image-file transfer cost, and the second image-file transfer is on the first computer. A program calculates if the combined cost is smaller than the first image-file processing cost plus performing the first image-file transfer plus the second image-file operation on the second computer plus the second image-file transfer. If the first image-file processing operation cost is smaller than or equal to the combined cost, the first computer performs the first image-file processing operation.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

DETAILED DESCRIPTION OF THE INVENTION

Figure 1:
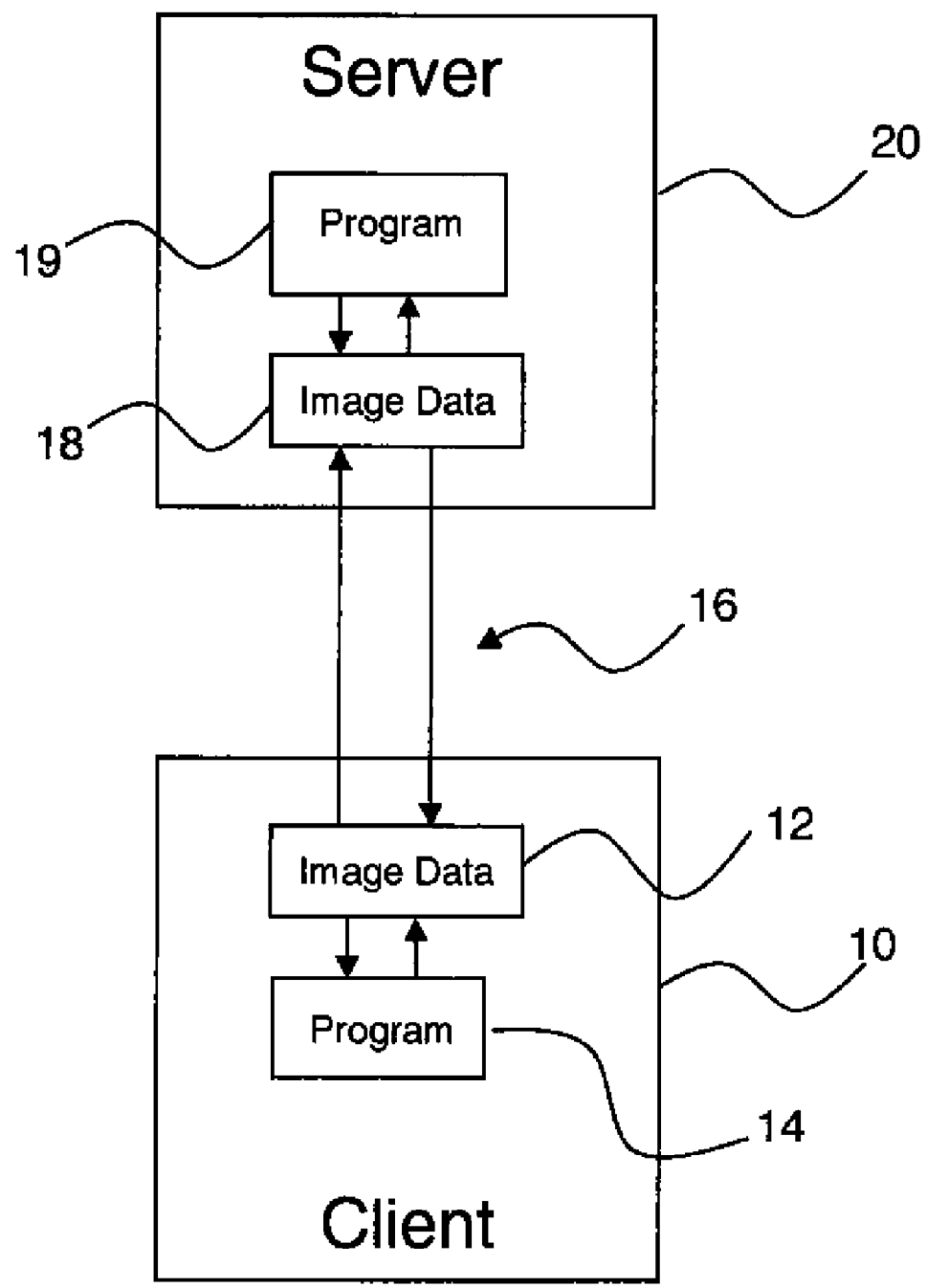
FIG. 1 is a schematic diagram illustrating data processed in a client/server computer network according to an embodiment of the present invention.
Figure 2:
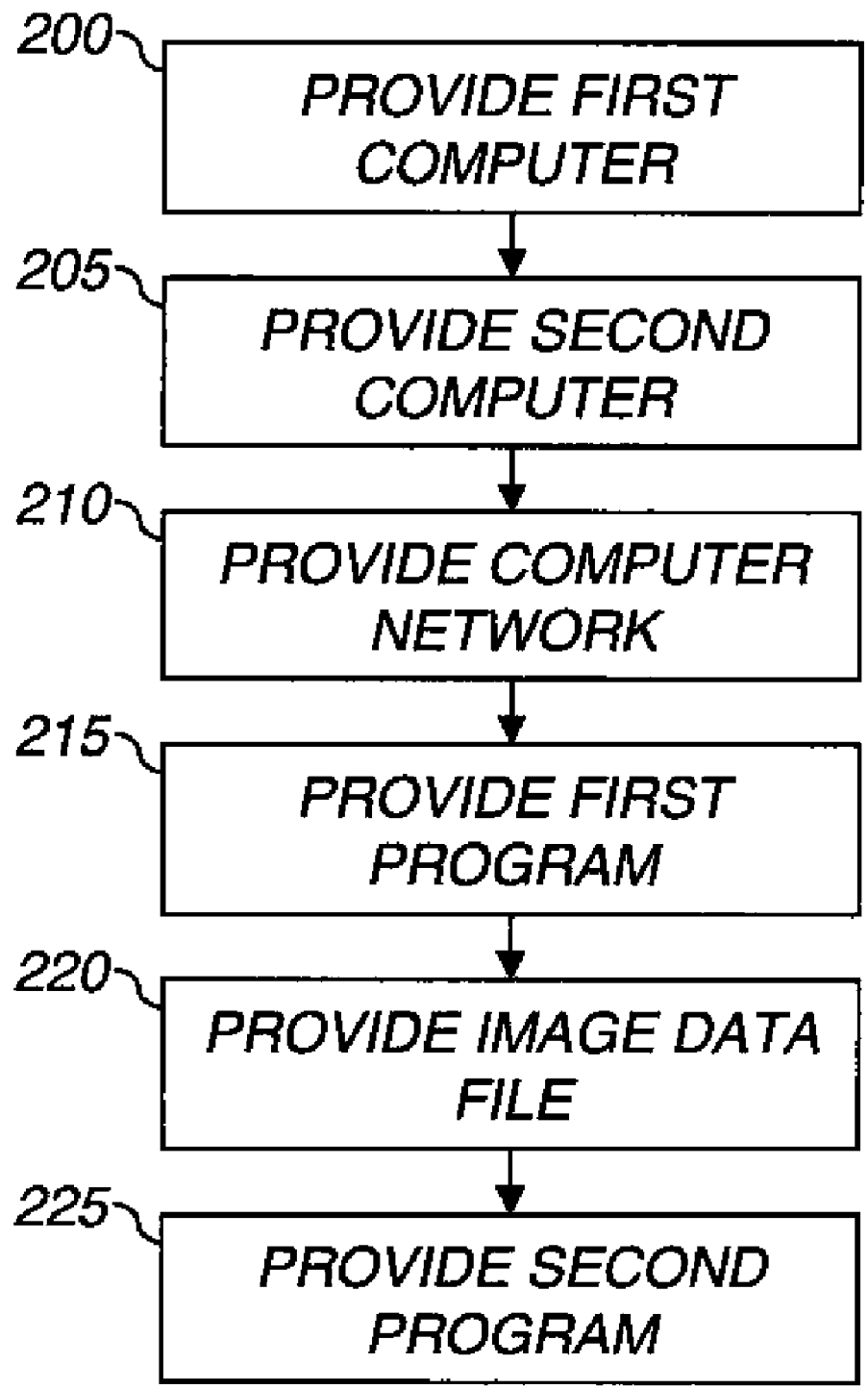
FIG. 2 is a flow diagram illustrating a portion of a method according to the present invention.

Referring to FIG. 1 and FIG. 2, in accordance with an embodiment of a method of the present invention, a method for processing image files in a computer network comprises the steps of providing a first computer 10 in step 200, connected to a second computer 20 provided in step 205, through a computer network 16 provided in step 210, the computer network 16 connecting the first computer 10 and the second computer 20 and transferring information between the first computer 10 and the second computer 20, the first computer 10 having one or more digital image files 12 provided in step 220 stored thereon. The computer network 16 can be the internet. A first program 14 is provided in step 215 for performing an image-file processing operation on the image file 12 on the first computer 10. The image file can be a digital image file, for example formed by a digital camera or scanner. A second program 19 is provided in step 225 for performing the image-file processing operation on the image file 18 on the second computer 20. The pixels in the image file 12 can be identical to the pixels in the image file 18, that is, the image file 12 on the first computer 10 can be copied or transferred over network 16 to the second computer 20.

Figure 3:
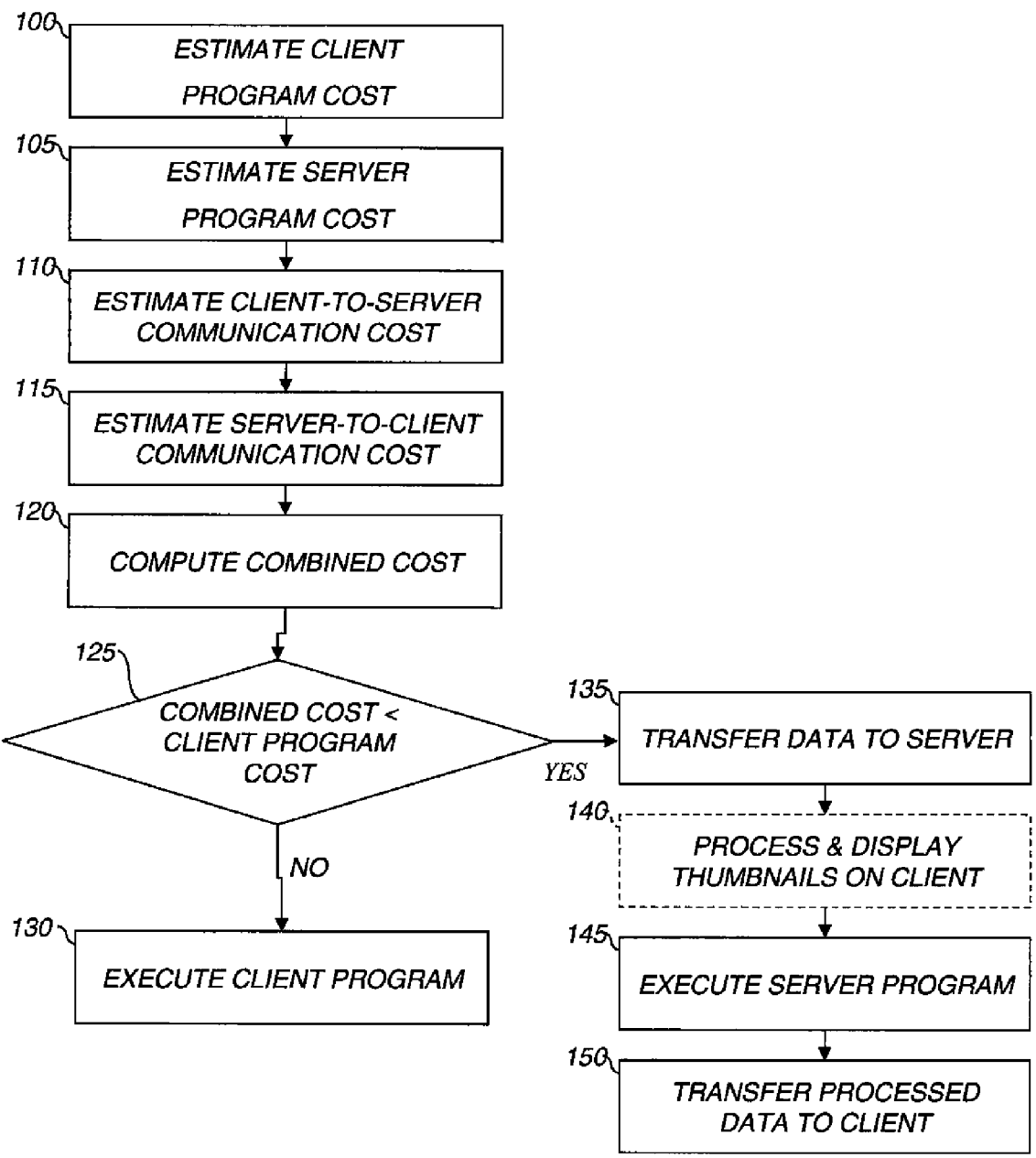
FIG. 3 is a flow diagram illustrating an embodiment of a method according to the present invention.

The first computer can be provided as a client computer and the second computer provided as a server computer. However, this disclosure is not limited to that embodiment. Referring to FIG. 3, a first image-file processing operation cost for the first program on the client computer is estimated in step 100. The second image-file processing operation cost for the second program on the server computer is estimated in step 105. The first image-file processing operation is essentially the same as the second image-file processing operation. If the first and second computers use similar hardware and operating systems, the two image-file processing operations can be executed with identical program object code. Alternatively, identical programs can be used but can be compiled into different object codes corresponding to the hardware needs of the first and second computers 10 and 20, respectively. In yet another alternative, a single algorithm describing the image-file processing operation can be employed on both the first and second computers 10 and 20, but different programs embodying the single algorithm can be used. This can be helpful since it is likely that the first computer 10, for example a client computer, comprises different hardware than the second computer 20, for example a server computer.

A first image-file transfer cost for transferring the image file from the client computer to the server computer is estimated in step 110 and a second image-file transfer cost for transferring an image file resulting from the second image file processing operation from the server computer to the client computer is estimated in step 115. The second image-file processing operation cost, the first image-file transfer cost, and the second image-file transfer cost are combined to form a combined cost in step 120.

Referring to step 125 of FIG. 3 and FIG. 1, if the combined cost is smaller than the first image-file processing operation cost (the client program cost), the first image-file is transferred from the client to the server computer in step 135, the second image-file operation is performed on the image file on the server computer in step 145, and the second image-file is transferred from the server to the client computer in step 150. Referring to step 125 of FIG. 3 and FIG. 1, if the combined cost is greater than or equal to the first image-file processing operation cost, the first image-file processing operation is performed on the first computer in step 130.

The operation costs on the first and second computers can be based on a combination of the image file size, a measure of the operation complexity, the hardware resources on the first and second computers, and the respective processor loading for the first and second computers. The comparative hardware resources can be estimated by the type of processor, speed of processor, memory (e.g. RAM), cache memory, as well as the storage access rate for each of the first and second computers. The image file size is typically known from the header of the image file or from storage system software responsible for managing the storage of image files (e.g. a disk sub-system). The operational complexity can be pre-calculated by comparing the number of arithmetic operations in the algorithm, or by actually measuring a time duration of the performance of the operations on a common platform which can then be stored in a file for later access and comparison. The image file size can be variable in operation.

The network performance and computer load can be found using available network tools, for example the Network Weather Service as described in the art. Alternatively, the first and second computers can track the network performance and their own processor load themselves using methods known in the art, e.g. measuring data transfer times and testing process queues on the computer.

The network performance, computer load, computer resources, operational complexity and file size can be combined to form a combined cost. For example, the combined cost can be calculated as:

$$TransferCost=ImageSizeA*NetworkRate+ImageSizeB*NetworkRate\ ServerCost=(ServerHW/ServerLoad)*(Algorithm*ImageSizeA)$$
$$CombinedCost=TransferCost+ServerCost$$

where ImageSizeA is the size of the image file (for example in Mbytes) on the client computer, ImageSizeB is the size of the image file after processing on the client computer (known from the type of image processing operation and often equal to ImageSizeA), and the NetworkRate is the Mbytes/second available bandwidth on the computer network. The ServerHW value is most usefully described as a relative performance value compared to other computing hardware platforms and can include cpu type, cpu clock frequency, and type and amount of memory. The ServerLoad value is usefully described as a percent value of the ServerHW resource available to the task, and can be found from operating system process queue information. The Algorithm value is most usefully described as a relative algorithm complexity value describing the number and difficulty of computing steps in the algorithm that implements the image-file operation.

The client image-file operation cost can be estimated as:

$$ClientCost=(ClientHW/ClientLoad)*(Algorithm*ImageSizeA)$$

where the ClientHW value is most usefully described as a relative performance value compared to other computing hardware platforms and can include cpu type, cpu clock frequency, and memory. The ClientLoad value is usefully described as a percent value of the ClientHW resource available to the task, and can be found from operating system process queue information.

The combined cost is essentially the cost, or delay, of transferring the image file from the client computer to the server computer, performing the image-file operation on the server computer, and returning the results back to the client. The client cost is the cost of doing the same operation on the client without transferring the data and employing internal memory transfers between the cpu and local client computer storage. Since the client, the server, and the computer network all experience dynamic performance loads, the choice of processing the image-file on the server versus processing the image-file on the client can vary over time. Since the server computer is likely to be considerably more powerful than the client computer and if the computer network connection is not busy, the choice to process the image-file on the server can be made. If, on the other hand, the server computer has a large workload and if the computer network connection is busy, the choice to process the image file on the client can be made.

In a client server arrangement mediated over the internet through a web browsing interface, user interaction (e.g. a graphic user interface) and image-file processing operation programs can be stored on the server computer and supplied to the client computer on request. The user interaction program can incorporate the image-processing operation program, or they can be separate. The user interaction program can be provided as part of a web page served from the second computer. Hence, the first and second programs can both be stored on the second computer, e.g. the server computer, and supplied to the first computer, e.g. the client computer, by transferring the first program over the computer network from the second computer to the first computer, where the first program can be executed on the first computer, if that choice is made. The program transfer does not need to take place if the decision not to process on the first computer is made.

As shown in FIG. 3 step 140, in a further embodiment of the present invention, if a decision to perform the image-file operation on the second computer is made, the first computer can process a low-resolution version of the image file (a thumbnail) and display the processed low-resolution image file version to a user. This can be done at the same time as the high-resolution image file is being transferred to the second computer, processed by the second computer, and returned to the first computer. If the low-resolution image-processing operation has a lower cost than the combined cost, the low-resolution image file can be displayed faster than the high-resolution image file is transferred, processed, returned, and displayed. This can improve the user experience and sense of responsiveness. Once the processed high-resolution image is returned, it can replace the low-resolution image version as necessary. Hence, a method of the present invention can further comprise the step of providing a third program from the second computer to the first computer, the third program performing the image-file processing operation on a low-resolution copy of the image file on the first computer.

Figure 4:
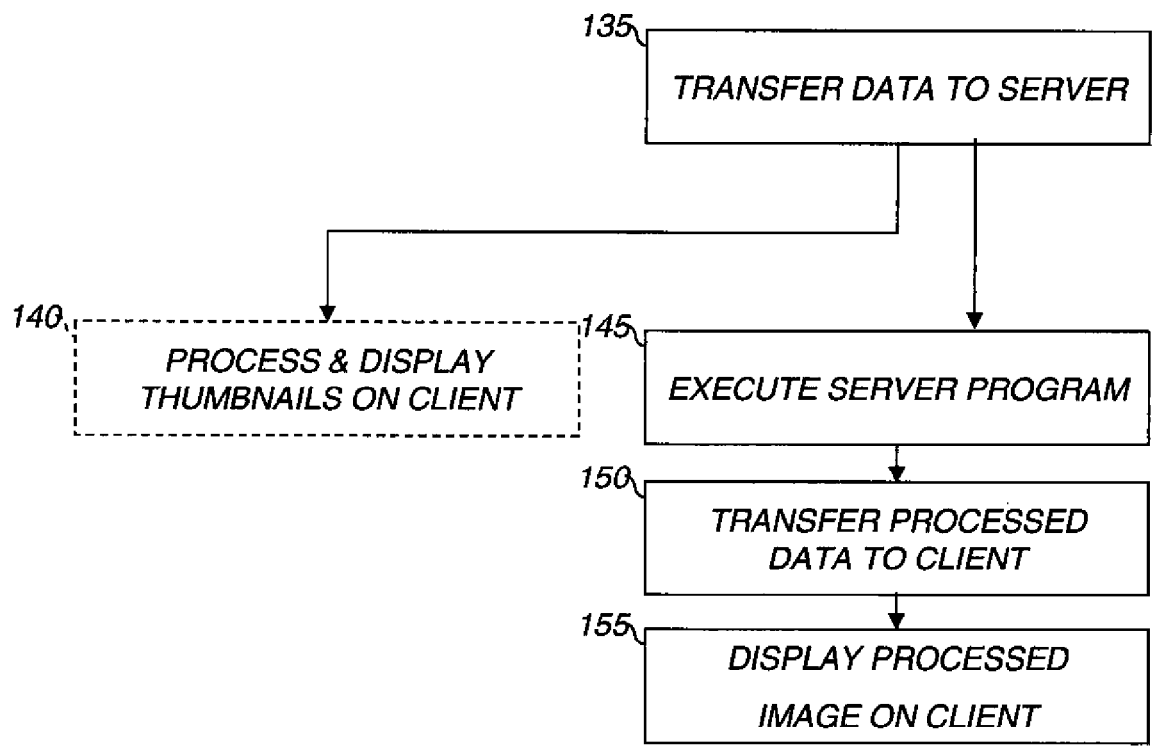
FIG. 4 is a flow diagram illustrating a portion of a method according to the present invention.

Referring to FIG. 4, the low-resolution image file processing on the first, client computer (step 140) can be done after the image file is transferred and at the same time as the image-file processing operation (step 145) on the second, server computer and the processed image data transfer from the second to the first computers (step 150). Once the processed image file is received by the first, client computer it can be displayed by the client (step 155). As is known in the computer system arts, the transfer operations can overlap the processing operations, since different system hardware elements can be used simultaneously. Likewise, the image-file operation processing on the second computer can overlap the image-file transfers. For example, a first portion of the image file can be transferred to the second computer and then a second portion of the image file can be transferred while the first portion is being processed. This overlapping of image-file transfer and processing can be performed both on input and output transfers.

In a further preferred embodiment of the present invention, the image file can be compressed on the first computer, transferred to the second computer, and uncompressed on the second computer. If the computer network bandwidth is very constrained while the image-processing resources of the first and second computers are great, such a method of transfer can reduce the overall transfer time. Similarly, the processed image file can be compressed on the second computer, transferred to the first computer, and uncompressed on the first computer.

Because network bandwidth availability can change over time it can be useful to repeatedly measure the effective rate of image-file transfers over the computer network and use the measurement to estimate the image-file transfer cost. Such repeated measurements help to ensure that the decision as to which of the first or second computers will process the image file is made with information that is recent and reliable. Likewise, the computing load of the first computer or the computing load of the second computer can be repeatedly checked and the checks used to estimate the image-file operation cost for the first and second computers, respectively.

The present invention can be repeatedly employed over time with more than one image file as part of a single user interaction or as part of separate interactions. Hence, a third image-file processing operation cost can be estimated for the first program on the first computer, a fourth image-file processing operation cost can be estimated for the second program on the second computer, a third image-file transfer cost can be estimated for transferring the image file from the first computer to the second computer, and a fourth image-file transfer cost can be estimated for transferring an image file resulting from the second image file processing operation from the second computer to the first computer. The fourth image-file processing operation cost can be combined with the third image-file transfer cost and the fourth image-file transfer cost to form a second combined cost. If the second combined cost is smaller than the third image-file processing operation cost, then the third image-file transfer, the fourth image-file operation, and the fourth image-file transfer can all be performed. If the third image-file processing operation cost is smaller than or equal to the second combined cost, the third image-file processing operation can be performed.

The first computer and second computer and the computer network can form a computer network for processing image files, as shown in FIG. 1. The network-connected computer system can comprise a first computer, a second computer, and a computer network, the computer network connecting the first computer and the second computer and transferring information between the first computer and the second computer; one or more image files stored on the first computer; a first program for performing an image-file processing operation on an image file on the first computer and a second program for performing the image-file processing operation on the image file on the second computer; programming for providing a first image-file processing operation cost estimation for the first program on the first computer, a second image-file processing operation cost estimation for the second program on the second computer, a first image-file transfer cost estimation for transferring the image file from the first computer to the second computer, and a second image-file transfer cost estimation for transferring an image file resulting from the second image file processing operation from the second computer to the first computer; and programming for combining the second image-file processing operation cost, the first image-file transfer cost, and the second image-file transfer cost to form a combined cost; and programming for calculating if the combined cost is smaller than the first image-file processing operation cost, performing the first image-file transfer, the second image-file operation on the second computer, and the second image-file transfer and for calculating if the first image-file processing operation cost is smaller than or equal to the combined cost, performing the first image-file processing operation on the first computer.

Figure 5:
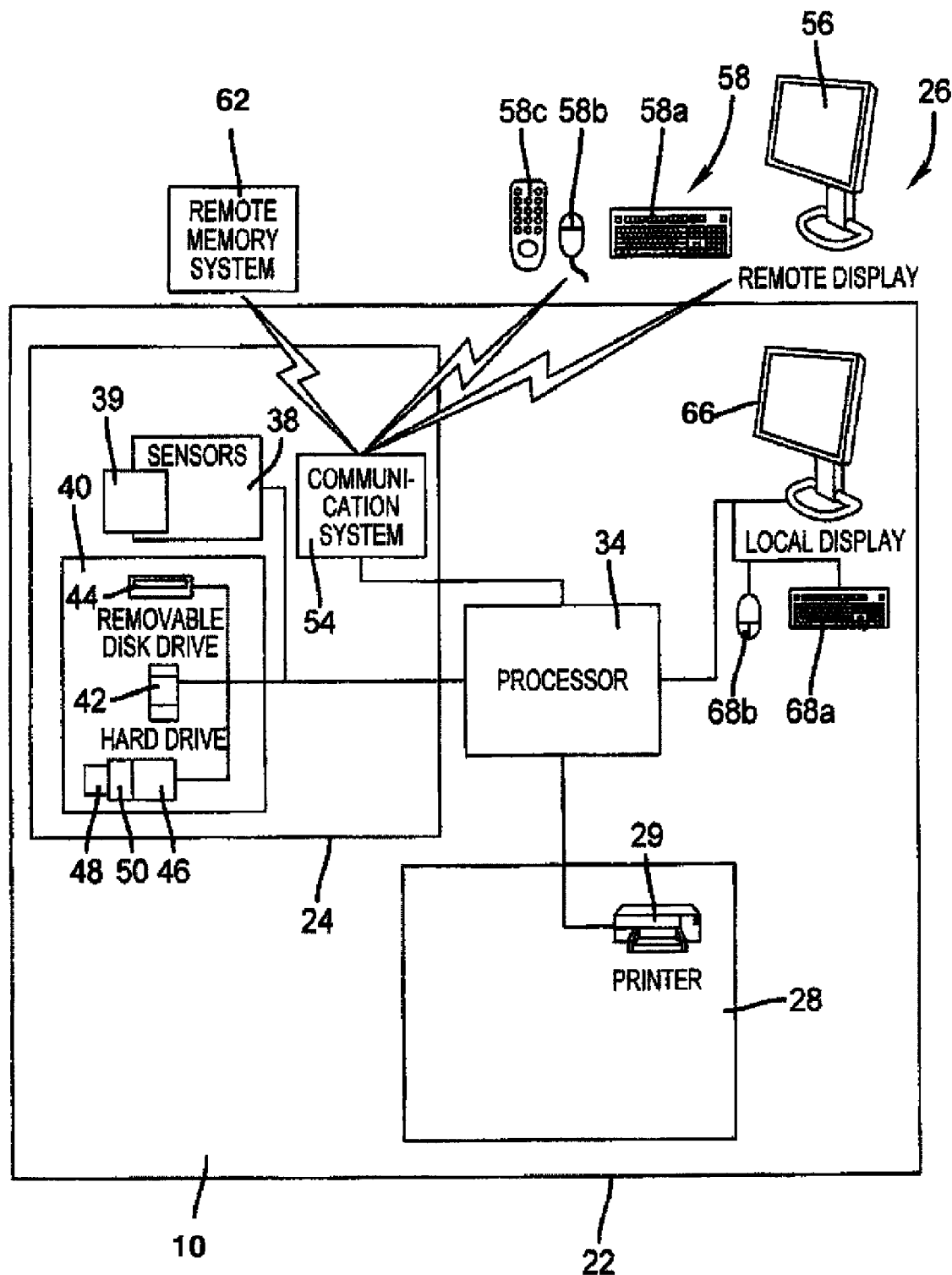
FIG. 5 is a processing system.

FIG. 5 illustrates a first embodiment of an electronic computer system 10 that can be used as a client computer for processing image files of the present invention. In the embodiment of FIG. 5, the computer system 10 comprises a housing 22 and a source of image data files such as digital images that have been prepared by or using other devices. In the embodiment of FIG. 5, source of image data files 24 includes sensors 38, a memory 40 and a communication system 54.

Sensors 38 are optional and can include light sensors, a camera and other sensors known in the art that can be used to obtain digital images in the environment of the system 10 and to convert this information into a form that can be used by processor 34 of the system. Sensors 38 can also include one or more video sensors 39 that are adapted to capture images.

Memory 40 can include conventional memory devices including solid state, magnetic, optical or other data storage devices for storing images, image products, etc. Memory 40 can be fixed within the system or it can be removable. In the embodiment of FIG. 5, the system 10 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, image processing software, control programs, digital images and metadata can also be stored in a remote memory system 52, corresponding to server memory 23 as described above (the server itself is not shown).

In the embodiment shown in FIG. 5, communication system 54 that in this embodiment can be used to communicate with an optional remote memory system 52, an optional a remote display 56, and/or optional remote input 58. A remote input station including a remote display 56 and/or remote input controls 58 (also referred to herein as "remote input 58") can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the interne, a cellular, peer-to-peer or other form of mobile telecommunication network, a local communication network such as wired or wireless local area network or any other conventional wired or wireless data transfer system.

User input system 26 provides a way for a user of the system to provide instructions to processor 34. This allows such a user to make a designation of image data files to be used in generating digital images and product specifications and to select an output form for the output product. User input system 26 can also be used for a variety of other purposes including, but not limited to, allowing a user to arrange, organize and edit digital images and products to be incorporated into the image product, to provide information about the user or audience, to provide annotation data such as voice and text data, to identify characters in the content data files, and to perform such other interactions with the system.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 5, user input system 26 includes an optional remote input 58 including a remote keyboard 58a, a remote mouse 58b, and a remote control 58c and a local input 68 including a local keyboard 68a and a local mouse 68b.

Figure 6:
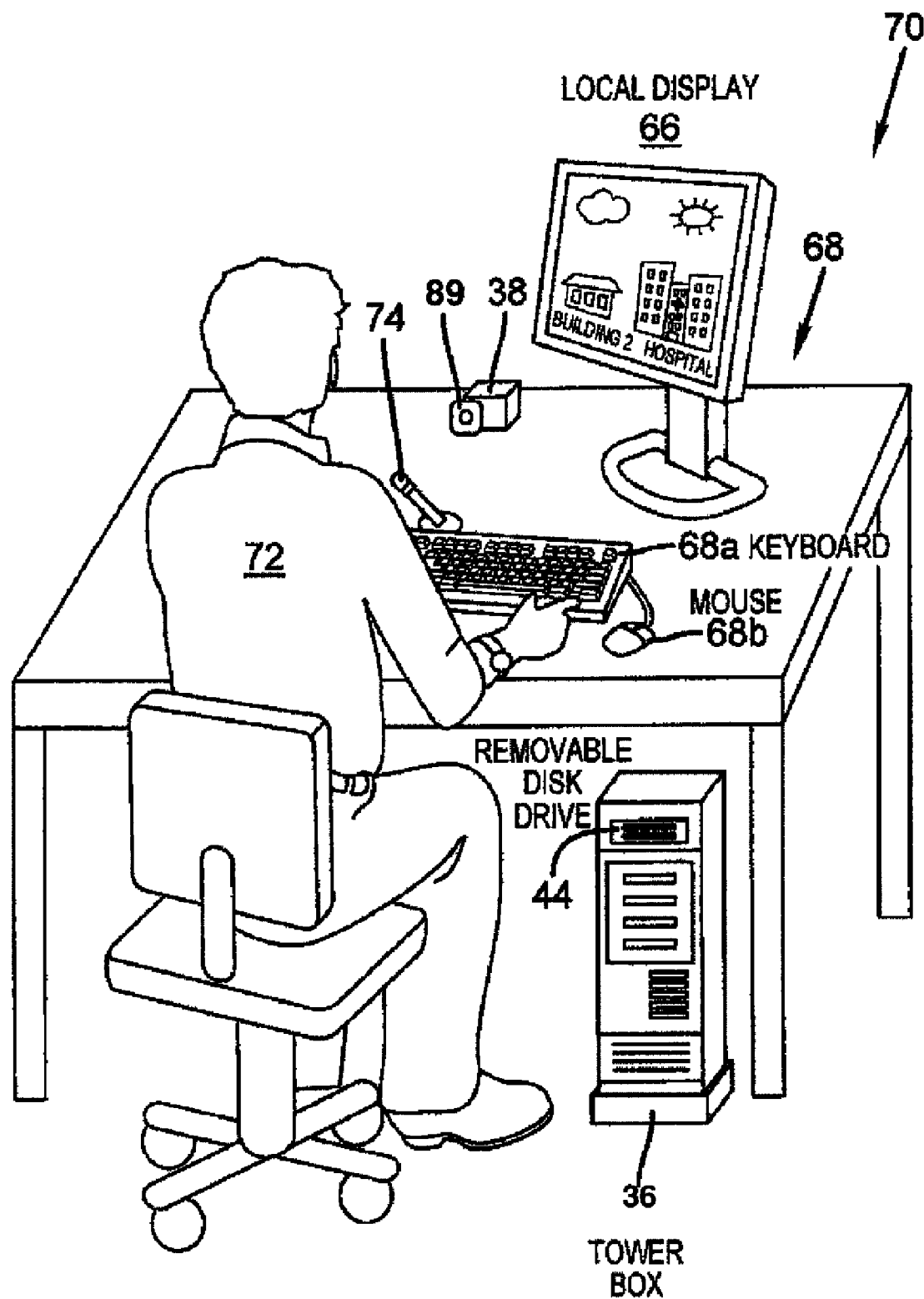
FIG. 6 is a typical processing system setup for user interaction.

As is illustrated in FIG. 6, client input 68 can take the form of an editing studio or kiosk 70 (hereafter also referred to as an "editing area 70"). In this illustration, a user 72 is seated before a console comprising local keyboard 68a and mouse 68b and a local display 66 which is capable, for example, of displaying multimedia content. As is also illustrated in FIG. 6, editing area 70 can also have sensors 38 including, but not limited to, video sensors 39, audio sensors 74 and other sensors.

Output system 28 is used for rendering images, text or other graphical representations in a manner that allows digital images and product specifications to be designed and recorded. In this regard, output system 28 can comprise any conventional structure or system that is known for printing rendered image products such as on printer 29. Printer 29 can record images on a tangible surface 30 using a variety of known technologies. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale or sepia toned images.

In certain embodiments, the source of content data files 24, user input system 26 and output system 28 can share components. Processor 34 operates system based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

The present invention can be employed to support business conducted over the internet, in particular for businesses that employ large amounts of digital storage, such as image printing for a client that interacts with a server and image storage system. It has been shown that improved responsiveness, improved computational efficiency, and reduced complexity are provided by using the various preferred embodiments of the present invention.

The invention has been described in detail with particular reference to certain preferred embodiments thereof, but it will be understood that variations and modifications can be effected within the spirit and scope of the invention.

PARTS LIST 10 client computer
12 client image data file
14 client program
16 network
18 server image data file
19 server program
20 server
100 calculate client program cost step
105 calculate server program cost step
110 calculate client-to-server communication cost step
115 calculate server-to-client communication cost step
120 compute server cost step
125 server cost<client program cost decision step
130 execute client program step
135 transfer data to server step
140 optional process and display thumbnails on client step
145 execute server program step
150 transfer processed data to client step
155 display full resolution processed image step
200 provide first computer step
205 provide second computer step
210 provide computer network step
215 provide first program step
220 provide image data file step
225 provide second program step

The invention claimed is:

1. A computer system comprising:
a first computer connected to a communication network, the first computer including one or more image files stored thereon and a first image processing program executable by the first computer for processing the one or more image files, and a memory for storing an effective rate of image file transfers over the communication network calculated by the first computer, and for storing a first and second processing costs and a combined cost calculated by the first computer based on the effective rate of image file transfers;
a second computer connected to the communication network, the second computer including said one or more image files and said first image processing program executable by the second computer for processing the one or more image files;
the first computer further including a costing program for determining the first processing cost for the first computer to process the one or more image files stored thereon, for determining a first transfer cost for transferring the one or more image files from the first computer to the second computer, for determining the second processing cost for the second computer to process the one or more image files, for determining a second transfer cost for transferring a processed one or more of the image files from the second computer to the first computer, and for determining the combined cost for the first transfer cost, the second processing cost, and the second transfer cost; and
a network connection for transferring the one or more image files over the network from the first computer to the second computer if the costing program determines that the combined cost is smaller than the first processing cost.

2. The computer system of claim 1 wherein the first computer processes the one or more image files using the first image processing program if the costing program determines that the combined cost is larger or equal to the first processing cost.

3. The computer system of claim 1 wherein the second computer is a server computer.

4. The computer system of claim 1 wherein the computer network is a local area network.

5. The computer system of claim 3 wherein the server computer comprises a user-interactive program that includes the first image processing program, and wherein the server computer transmits the user-interactive program to the first computer over the network.

6. The computer system of claim 5, wherein the user-interactive program is a web page.

7. The computer system of claim 1, wherein the server computer comprises an image processing program for processing a low resolution copy of the one or more image files, and wherein the server computer transmits the image processing program for processing a low resolution copy of the one or more image files to the first computer over the network.

8. The computer system of claim 7, wherein the first computer comprises storage for storing the image processing program for processing a low resolution copy of the one or more image files, and wherein the first computer processes a low-resolution copy of the one or more image files stored thereon and stores a low-resolution processed version of the low resolution copy after transmitting the one or more image files from the first computer to the second computer.

9. The computer system of claim 1, wherein the first computer further comprises a display for displaying a processed one of the one or more image files.

10. The computer system of claim 1, wherein the first computer system comprises a compression program for compressing the one or more image files on the first computer before transferring the one or more image files to the second computer.

11. The computer system of claim 10, wherein the second computer system comprises a decompression program for decompressing the one or more image files received from the first computer.

12. The computer system of claim 11, wherein the second computer comprises a compression program for compressing the one or more image files received from the first computer after processing the one or more image files received from the first computer using said first image processing program and before transmitting the processed one or more image files to the first computer.

13. The computer system of claim 12, wherein the first computer comprises a decompression program for decompressing the processed one or more image files on the first computer received from the second computer.

14. The computer system of claim 1, wherein the first computer comprises a first image processing program for processing the one or more image files stored thereon, and the second computer comprises a second image processing program for processing the one or more image files.

* * * * *